United States Patent [19]

Felburn

[11] 4,061,361
[45] Dec. 6, 1977

[54] VEHICLE SUSPENSIONS

[76] Inventor: J. Phil Felburn, P.O. Box 2344, Arlington, Va. 22202

[21] Appl. No.: 677,049

[22] Filed: Apr. 14, 1976

[51] Int. Cl.² .............................................. B60G 19/02
[52] U.S. Cl. .................................. 280/681; 267/15 A
[58] Field of Search ............... 280/677, 678, 681, 711; 267/15, 18

[56] References Cited

U.S. PATENT DOCUMENTS

| 3,241,856 | 3/1966 | Raidel | 280/681 |
| 3,332,701 | 7/1967 | Masser | 267/15 A |

FOREIGN PATENT DOCUMENTS 958,788  5/1964  United Kingdom.

Primary Examiner—Philip Goodman
Attorney, Agent, or Firm—Michael Williams

[57] ABSTRACT

A suspension for a vehicle having wheel-supporting axles arranged in tandem. The suspension comprises a walking beam pivoted intermediate its ends to the frame of the vehicle. The axle support of one road engaging wheel is secured to one end of the walking beam, and the axle support of the other road engaging wheel is secured to a support arm which is mounted for pivotal movement relative to the walking beam. An air bag is interposed between the support arm and the opposite end of the walking beam. The walking beam provides for equalizing movement between the tandem axles and a cushioning member, such as an air bag and the like absorbs road shock during such equalizing movement.

18 Claims, 12 Drawing Figures

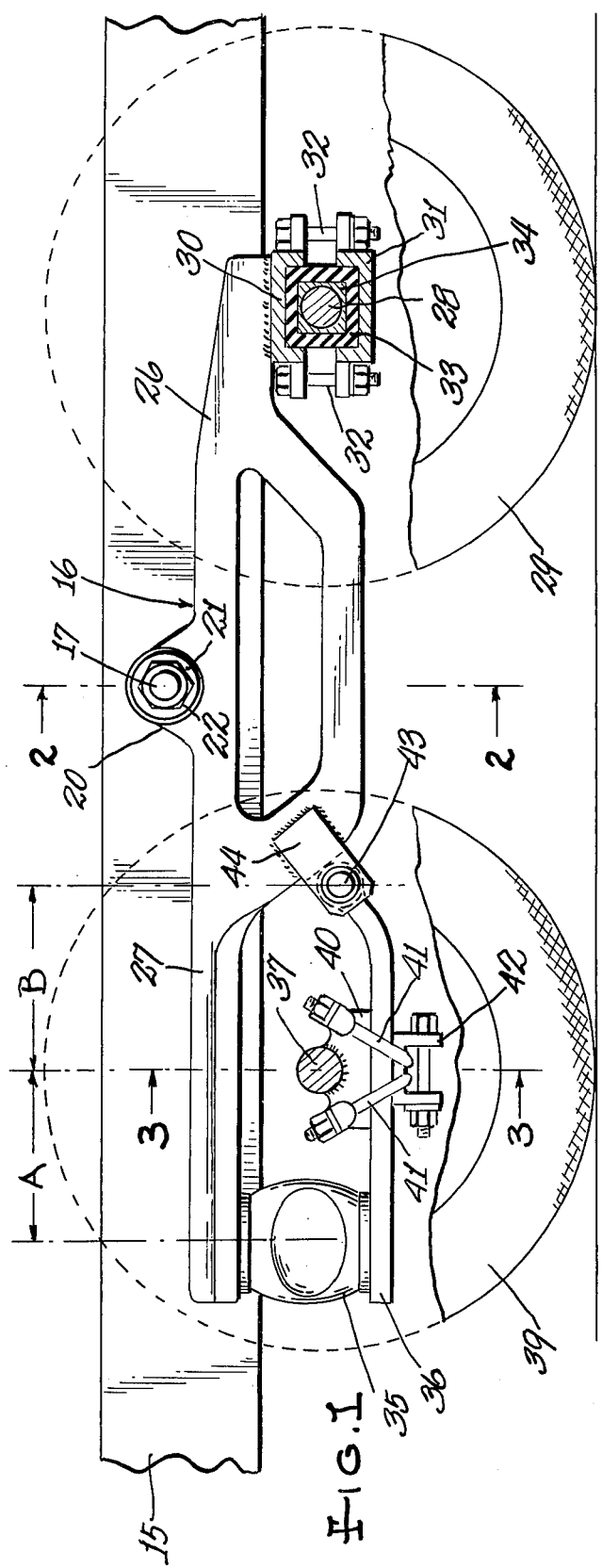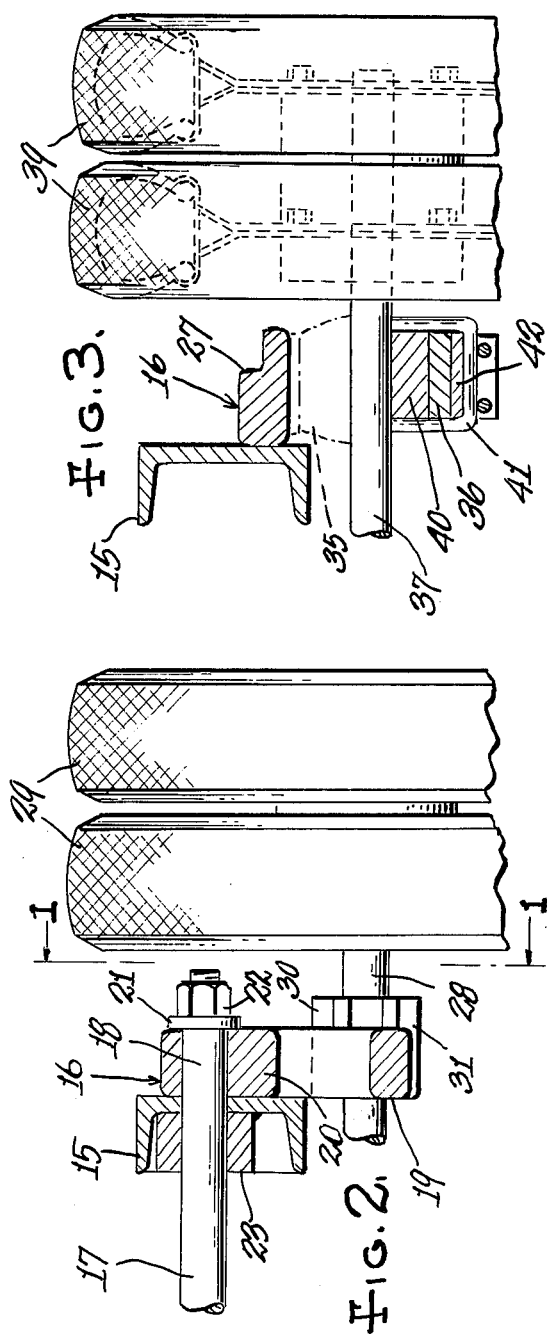

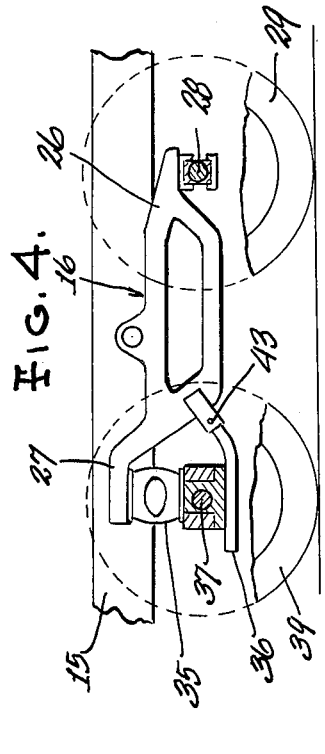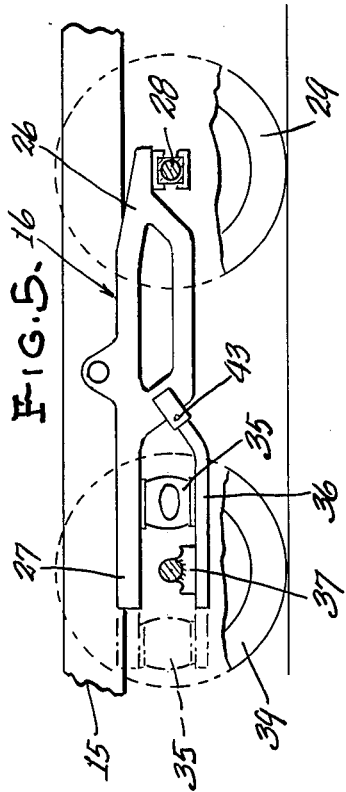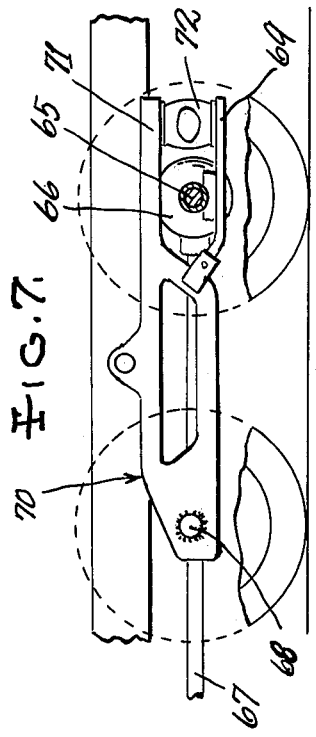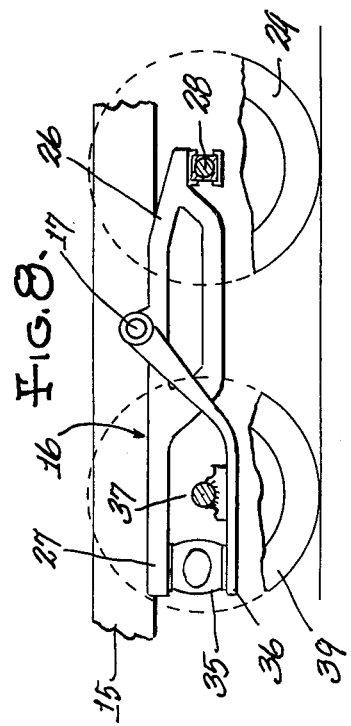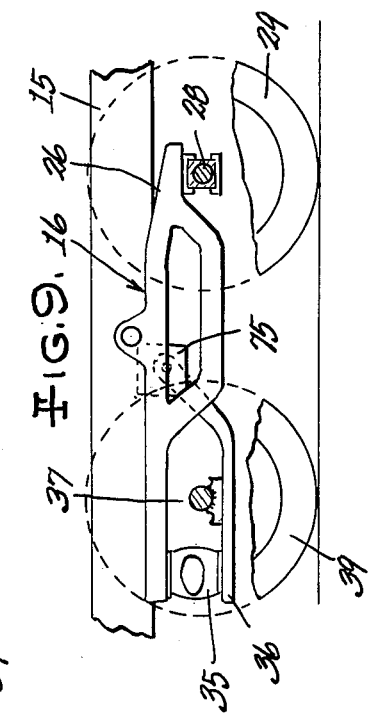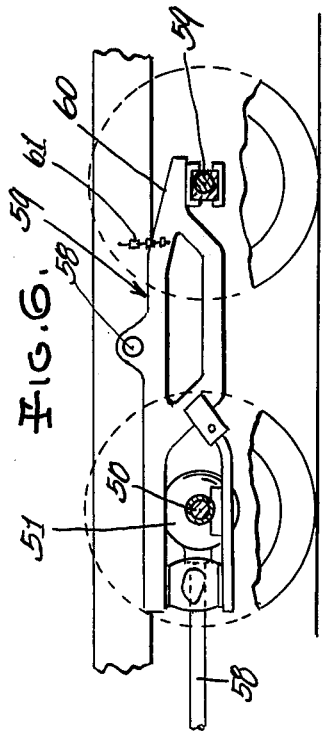

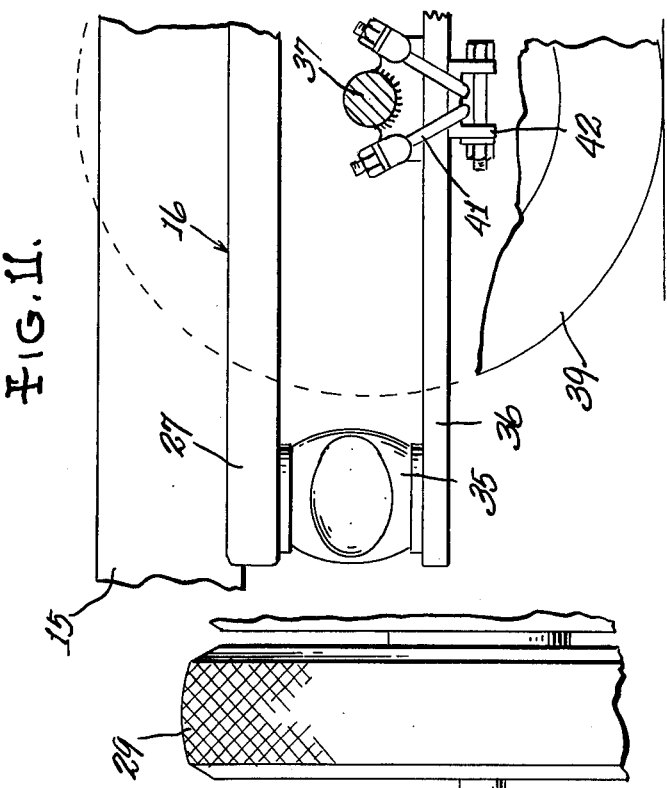
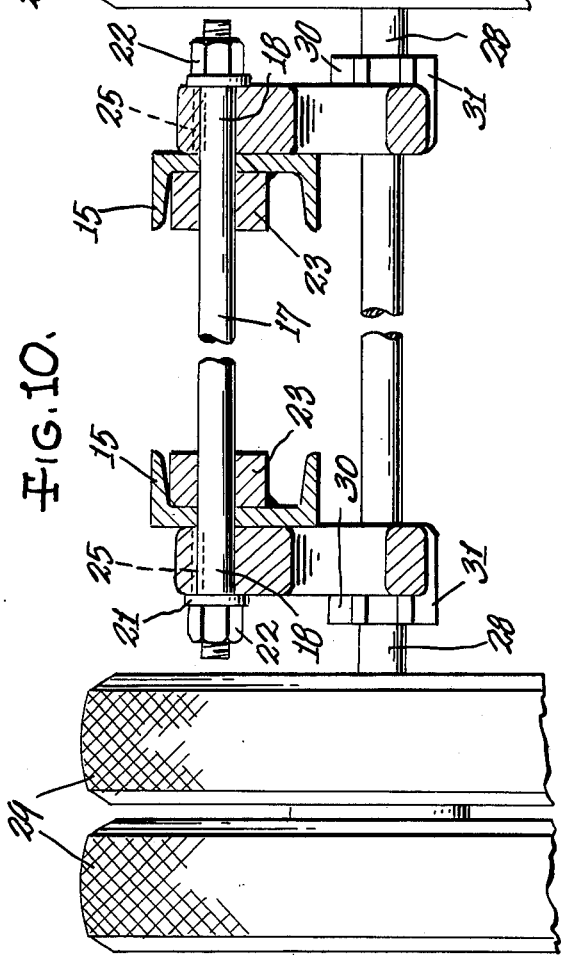
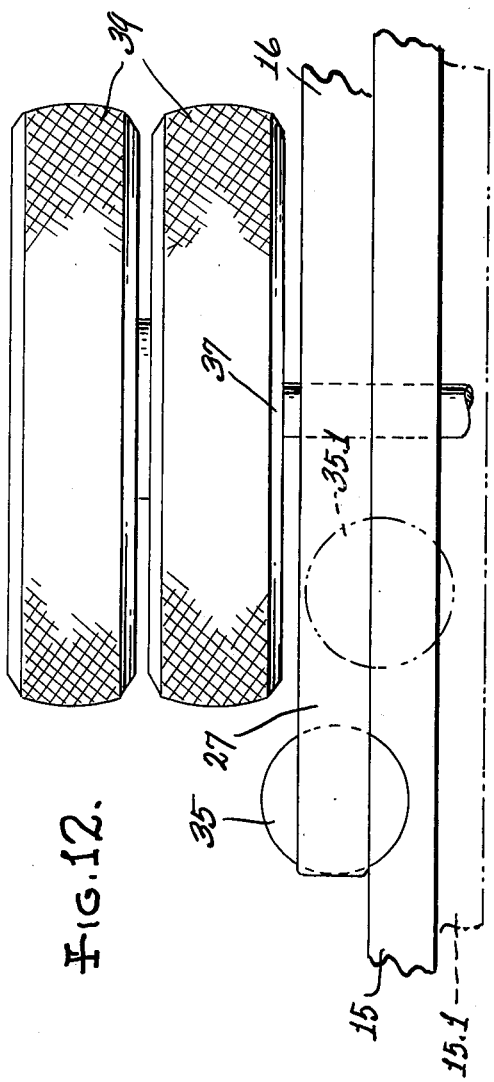

VEHICLE SUSPENSIONS

BACKGROUND AND SUMMARY

Air bag suspensions, as well as walking beam suspensions, are known in the prior art, but my invention combines these in a new and novel manner to provide an improved suspension.

In a tandem axle suspension, a pair of spaced wheel axles extend crosswise of the frame of the vehicle. Each axle supports a pair of wheels and each wheel is outboard of a respective one of a pair of channels which extend longitudinally of the vehicle and, with crossbraces, form the main frame of the vehicle.

In my improved suspension, a walking beam is pivoted intermediate its ends to a respective frame channel, and preferably parallel to but outboard of the same. Axle supports are respectively connected to a common end of each walking beam to support an axle therebetween. A support arm is pivotally associated with each of the other common ends of the walking beams, each arm having an axle portion connected thereto.

The support arms are disposed in spaced relation with respective ones of the other common ends of the walking beams, and an air bag is disposed between each support arm and the related end of the walking beam. Each walking beam is pivotally mounted on its related main frame channel, and the pivot therefor may be in the form of stub shafts secured to respective frame channels. However, to increase rigidity of the main frame, it is preferred to employ a shaft which extends between the pair of channels forming the frame, with opposite ends of the shaft journalled in bearings carried by respective channels. The walking beams may be mounted on the opposite shaft ends for independent pivotal movement, or they may be keyed to such opposite ends so that the shaft acts as a torsion rod.

DESCRIPTION OF THE DRAWINGS

In the drawings accompanying this specification and forming a part of this application, there are shown, for purposes of illustration, embodiments which my invention may assume, and in these drawings:

FIG. 1 is a side elevation, partly in section, of my improved suspension, the view corresponding generally to the line 1—1 of FIG. 2, with tires fragmentarily shown in full lines, FIG. 2 is a transverse sectional view generally corresponding to the line 2—2 of FIG. 1, FIG. 3 is a tansverse sectional view generally corresponding to the line 3—3 of FIG. 1.

FIGS. 4 and 5 are views similar to FIG. 1, drawn to a reduced scale, and showing various different locations of the air bags, FIGS. 6 and 7 are views similar to FIG. 1, drawn to a reduced scale, and showing the suspension adapted for use with the drive train of a truck or tractor, FIG. 6 showing the differential housing and drive shaft in position to power the forward axle with the rear axle as a towed or tag axle, and FIG. 7 showing the differential housing and drive shaft in position to power the rear axle, with the front axle now pushed, FIGS. 8 and 9 are views similar to FIG. 1, drawn to a reduced scale, and showing the support arms in various pivoted relations with the walking beam, FIG. 10 is a section similar to FIG. 2, but showing both frame channels and a shaft having key connection with both walking beams to serve as a torsion rod, FIG. 11 is a view similar to FIG. 1, but showing an air bag disposed in advance of and clear of interference with the road engaging wheels, and FIG. 12 is a fragmentary plan view of the construction shown in FIG. 11, illustrating the benefits derived from the same.

DESCRIPTION OF THE PREFERRED EMBODIMENT

The frame of a truck or trailer usually includes a pair of sturdy metal channels 15, 15 (only one seen in FIG. 1, but both shown in FIG. 10). Such channels extend longitudinally of the vehicle and are held in predetermined laterally spaced relation by the usual cross-channels (not shown). The frame channels 15 usually face each other, as shown in FIG. 10, so that the flat face of each is turned outwardly.

A pair of walking beams 16, 16 are pivotally mounted on the frame channels, and the pivotal mount may be effected in various ways. In order to provide additional rigidity to the vehicle frame, it is preferred that the pivot connection be in the form of a sturdy shaft 17 which extends crosswise of the frame channels 15, 15 with opposite ends 18 projecting beyond the outwardly turned flat faces of the channels.

Each walking beam is a sturdy, elongated member, formed as a welded fabrication, forging or casting, and having a flat inner face 19 adapted to slidably engage the adjoining flat surface of a related frame channel for guidance and support. As seen in FIGS. 1 and 2, each walking beam has an upstanding hub 20 which closely fits over the adjoining end 18 of the cross-shaft 17 to rotate thereabout. A suitable bearing (not shown) may be interposed between the shaft and the hub. Each end of the cross-shaft 17 has a reduced, threaded end to receive a washer 21 and a nut 22. The nut, through the washer, closely holds the flat face 19 of the walking beam in sliding engagement with the adjoining flat face of the frame channel.

Bearings 23 are welded within each channel 15 to provide journals for the opposite ends of the cross-shaft 17 and the latter is free to rotate therein so that rotating movements of the walking beams may cause the cross-shaft 17 to rotate slightly within the bearings 23 to prevent formation of wear spots. It will be appreciated that the walking beams may rotate on the cross-shaft 17 independently of each other. Instead of having the shaft 17 extend crosswise of the frame channels, each walking beam may be pivoted on a stub shaft which is welded to a respective channel and extends outwardly therefrom in the manner of the shaft ends 18, with a threaded end and a nut thereon to hold the walking beam in place. Also, as shown in FIG. 10, each walking beam may be fixed to the cross-shaft 17, as by a key 25, so that the shaft acts as a torsion bar to permit limited relative movement of the walking beams.

Referring to FIGS. 1 and 3, each walking beam has arm portions 26 and 27 on opposite sides of the pivot provided by the cross-shaft 17. A wheel axle 28 extends crosswise and outwardly of the arm portions 26 of the two walking beams, and road engaging wheels 29 are journalled on opposite ends of the axle, by means of commercially available bearings (not shown). Each axle end may be supported on the arm portion 26 of a respective walking beam by construction shown in FIGS. 1 and 2, including a pair of opposed, shallow channel sections 30 and 31. The section 30 is welded to the respective arm portion 26 and the section 31 is held to the section 30 by bolts 32 to provide a socket for a rubber bushing 33 having a square cross-section. The axle 28 is normally round in cross-section but at the part which extends through the rubber bushing the axle has segments 34 welded thereto to provide a square cross-section which is closely received within the square hole in the rubber bushing. The bolts 32 clamp the bushing tightly in place, but the bushing permits a limited amount of radial movement of the shaft to absorb brake torque and provides a limited amount of flexibility to permit opposite ends of the axle to shift slightly to accommodate a small amount of axle tilting.

The other arm portion 27 of each walking beam is adapted to cooperate with an air bag 35 and a support arm 36 to carry a wheel axle 37. The air bag may be of standard construction, such as now being used in vehicle suspensions. As shown in FIGS. 1 and 3, the axle 37 extends crosswise of and outwardly of the pair of support arms 36 and has its opposite end portions connected to a respective support arm. The axle end portion is welded to a saddle 40 and the latter is held in adjusted position along its related support arm by U-bolts 41 and a channel section 42. This construction provides for adjustment of the end portions of the axle to provide for alignment of the axle with the longitudinal line of the vehicle, for proper tracking purposes. Each support arm has an end pivotally connected, as at 43, between the pair of legs of a bracket 44 which is welded to the outwardly directed surface of the respective walking beam 16.

In the embodiment disclosed in FIGS. 1 through 3, each walking beam 16 may swing about the cross-shaft 17 independently of the other. Independent swinging movement of the walking beams will be limited by the rear cross-axle 28 to the amount permitted by the rubber mounts of such axle, and by the front cross-axle 37 to that permitted by flexing of the U-bolt connections. The construction is such that in the event a front tire, such as 39, strikes a bump in the road, it will be moved upwardly and will swing the support arm 36 upwardly to press against the air bag 35. If the bump is a very slight one, the air bag may absorb the shock; however, if the bump is of some consequence, the air bag 35 will transmit force to the walking beam arm portion 27 to swing the latter upwardly and thereby cause downward swinging of the walking beam arm portion 26, which in turn moves the axle 28 and the wheels supported thereby in a downward direction. On the other hand, if the rear wheels 29 strike a bump in the road, this will swing the walking beam arm portion 26 upwardly and the arm portion 27 downwardly. The initial action in this case is to cause compression of the air bag 35, but if the bump is of some consequence, the air bag cannot absorb all of the shock and it will in turn force the front wheel 39 downwardly.

In FIG. 1, the dimension A between the centerline of the air bag and the axis of axle 37 is shown as being substantially equal to the dimension B between the axis of the axle 37 and the pivot axis 43 of the support arm 36. If axle 37 is required to carry 6000 lbs. (2700 kilograms), this load is carried equally by the air bag 35 and the pivot connection 43. Thus, the air bag may be smaller in size and this permits a lesser distance between the tires and the main frame, so that the latter may be wider. It will be appreciated that the dimensions A and B may be varied to suit truck or trailer design requirements. If, for example, the dimension A is one half that of B, and assuming the total axle load to be 6000 lbs. (2700 kilograms), the air bag 35 would carry 4000 lbs. (1800 kilograms) and the pivot connection 43 would carry 2000 lbs. (900 kilograms).

DESCRIPTION OF OTHER EMBODIMENTS

Further flexibility in suspension design may be effected by varying the disposition of the air bag 35 relative to the axle 37. For example, in FIG. 4, the suspension is substantially the same as previously described, except that the air bag 35 is disposed in vertical alignment with the axle 37. This has advantage in that the forward arm portion 27 of the walking beam 16 and the support arm 36 may be less in length, to effect compactness. However, in this case the full load imposed on the axle 37 will be carried by the air bag. The air bag 35 may also be disposed between the axle 37 and the pivot connection 43, as shown in full lines in FIG. 5. If desired, two air bags may be used, the one shown in full lines in FIG. 5, and the one shown in dot-dash lines in the same Figure. In the latter case, the support arm 36 and the forward arm portion 27 of the walking beam 16 would be extended to accommodate the second air bag. It will be apparent that when two air bags are used, they may both be of a smaller size than required in a single air bag suspension, since each will carry part of the load.

FIGS. 6 and 7 disclose my improved suspension for use with tandem axles of a truck or tractor. FIG. 6 shows a construction wherein the front axle 50 is the driving axle and is associated with the differential 51 of the drive train, including the drive shaft 58 which leads forwardly to the transmission (not shown). The rear axle 59 will be the same as the axle 28 heretofore described, and is termed a "tag" axle in that it is towed from the cross-shaft 58 of the walking beam 59. In order to improve traction of the wheels on the drive axle 50, means may be connected between the rear arm portion 60 of the walking beam and the truck frame to permit upward movement of the portion 60 but limit downward movement. An example of such limiting means may be a chain 61 having its ends connected to the frame and the portion 60, as shown in FIG. 6.

In FIG. 7, the rear axle 65 is the driving axle and is associated with the differential 66 of the drive train, including the drive shaft 67 which leads forwardly to the transmission (not shown). In this embodiment, the front axle is in the form of a pair of stubs 68 (only one shown in FIG. 7). Each stub is seated within an opening in its related walking beam and is rigidly welded thereto, and will directly support a wheel assembly. Since each stud axle does not project beyond the inner face of its related walking beam, adequate clearance is provided for the drive shaft 67 and to permit use of a low truck frame. In FIG. 7, the rear axle 65 is carried by a support arm 69, which is pivoted to the walking beam 70 and an air bag 72 is interposed between the support arm 69 and the rear arm portion 71 of the walking beam. The construction shown in FIG. 7 is preferred over that shown in FIG. 6, since it places the differential 66 at the rear of the suspension where it is readily available for maintenance and repair. The rear axle drive of FIG. 7 is also preferred since it provides good road traction, especially when driving up hill wherein the center of gravity of the load is concentrated rearward.

FIGS. 8 and 9 disclose variations of the pivot connection between the support arm 36 and the front arm portion 27 of the walking beam 16. In FIG. 8, each support arm is pivoted on the cross-shaft 17 which also provides the pivot for the walking beams 16. In FIG. 9, each support arm 36 is pivoted to a bracket 75 which is welded to and extends downwardly from a respective frame channel 15. In the embodiment of FIGS. 8 and 9, it will be noted that the support arms are carried by the vehicle frame members rather than by the walking beams.

In the embodiment disclosed in FIGS. 11 and 12, the forward portion 27 of the rocking beams 16 and the support arms 36 are extended so that the air bag 35 is supported therebetween in advance of the tires. Thus, the clearance between the air bag and tires, as is necessary in the other embodiments, is no longer a design factor, and the frame channels may be laterally spaced a greater distance apart to provide increased truck or trailer stability. The greater spacing of the frame channels is illustrated by the channel 15 shown in full lines, as opposed to the channel 15.1 shown in dot-dash line in the previous position. The air bag 35 is shown in full lines in the embodiment of FIGS. 11 and 12, and is shown in dot-dash lines at 35.1 in FIG. 12 in the previous position.

I claim:

1. A suspension for a vehicle having a frame including a pair of laterally spaced, longitudinally extending channels, comprising:
   a pair of walking beams, each pivoted intermediate its ends to a respective channel to extend generally parallel thereto, said walking beams having one set of common ends on one side of the pivot and another set of common ends on the other side of the pivot,
   a first axle secured crosswise to respective ones of said one set of common ends and supporting a road-engaging wheel,
   a pair of support arms, each pivotally associated with a respective one of said walking beams,
   a pair of air bags, each disposed between and having its opposite ends connected to a support arm and a respective one of the other set of common ends of said walking beams, each air bag and its related support arm and walking beam end combining to support a second axle, and a road-engaging wheel supported by said second axle,
   each support arm having one end pivotally connected to its related walking beam below the latter's pivot and in a direction toward the related air bag, each support arm underlying and vertically spaced from the related walking beam end, the related air bag being disposed in the vertical space.

2. A suspension for a vehicle having a frame including a pair of laterally spaced, longitudinally extending channels, comprising:
   a pair of walking beams mounted on opposite ends of a cross-shaft and the latter being journalled in bearings carried by said frame channels, each of said walking beams extending generally parallel to a respective channel,
   said walking beams having one set of common ends on one side of the pivot formed by said cross-shaft and bearings, and another set of common ends on the other side of said pivot,
   a first axle secured crosswise to respective ones of said one set of common ends and supporting a road-engaging wheel,
   a pair of support arms, each pivotally associated with a respective one of said walking beams,
   a pair of air bags, each disposed between and having its opposite ends connected to a support arm and a respective one of the other set of common ends of said walking beams, each air bag and its related support arm and walking beam end combining to support a second axle, and a road-engaging wheel supported by said second axle,
   each walking beam being keyed to its respective cross-shaft end, said cross-shaft acting like a torsion rod between said walking beams.

3. A suspension for a vehicle having a frame including a pair of laterally spaced, longitudinally extending channels, comprising:
   a pair of walking beams, each pivoted intermediate its ends to a respective channel to extend generally parallel thereto, said walking beams having one set of common ends on one side of the pivot and another set of common ends on the other side of the pivot,
   a first axle secured crosswise to respective ones of said one set of common ends and supporting a road-engaging wheel,
   a pair of support arms, each pivotally associated with a respective one of said walking beams,
   a pair of air bags, each disposed between and having its opposite ends connected to a support arm and a respective one of the other set of common ends of said walking beams, each air bag and its related support arm and walking beam end combining to support a second axle, and a road-engaging wheel supported by said second axle,
   said suspension being adapted for a vehicle having a drive train, one of said first and second axles being a drive axle.

4. A suspension for a vehicle having a frame including at least one longitudinally extending channel, comprising:
   a walking beam pivoted intermediate its ends to said channel to extend generally parallel to the latter,
   an axle carried by one end of said walking beam and supporting a road-engaging wheel,
   a support arm pivotally associated with said walking beam, said support arm having a free end underlying but spaced from the other end of said walking beam,
   a second axle carried by said support arm free end and extending crosswise through the space between said free end and said walking beam other end,
   the pivots for both said walking beam and said support arm being disposed on the same side of said second axle, and
   a cushioning member, such as an air bag and the like, between and having its opposite ends connected to said support arm free end and said other walking beam end.

5. The construction according to claim 4 wherein said support arm is pivotally connected to the said walking beam other end.

6. The construction according to claim 4 wherein said support arm is pivoted to said channel.

7. The construction according to claim 4 wherein said support arm is pivoted to said channel coaxially with the pivot of said walking beam.

8. The construction according to claim 4 wherein said second axle is secured to said support arm and the latter underlies said walking beam other end in aligned but spaced relation.

9. The construction according to claim 8 wherein said air bag is disposed between said support arm and said walking beam other end at a distance greater than the distance between said walking beam pivot and the axis of said second axle.

10. The construction according to claim 8 wherein said air bag is disposed between said support arm and said walking beam other end and substantially vertically above said second axle.

11. The construction according to claim 8 wherein said air bag is disposed between said support arm and said walking beam other end at a distance less than the distance between said walking beam pivot and the axis of said second axle.

12. The construction according to claim 4 wherein said frame channel and said walking beam have juxtaposed flat side surfaces, the side surface of said walking beam being in sliding engagement with the side surface of said frame channel to be guided thereby.

13. A suspension for a vehicle having a frame including a pair of laterally spaced, longitudinally extending channels, comprising:
   a pair of walking beams, each pivoted intermediate its ends to a respective channel to extend generally parallel thereto, said walking beams having one set of common ends on one side of the pivot and another set of common ends on the other side of the pivot,
   a first axle secured crosswise to respective ones of said one set of common ends and supporting road-engaging wheels,
   a pair of support arms, each pivotally associated with a respective one of said walking beams,
   each of said support arms having a free end underlying but spaced from a respective one of the other common ends of said walking beams,
   a further axle carried by each support arm free end and extending crosswise through the space between such free end and related end of said walking beams,
   the pivots for said walking beams and said support arms being disposed on the same side of said further axle, and
   a pair of air bags, each disposed between and having its opposite ends connected to a support arm free end and the related end of a walking beam.

14. The construction according to claim 13 wherein said walking beams are mounted on opposite ends of a cross-shaft and the latter being journalled in bearings carried by said frame channels.

15. The construction according to claim 14 wherein each of said walking beams is free to rotate on its respective cross-shaft end.

16. A suspension for a vehicle having a frame including a pair of laterally spaced, longitudinally extending channels, comprising:
   a cross-shaft between said channels and having opposite ends journalled in bearings carried by respective channels,
   a pair of walking beams, each mounted on a respective end of said cross-shaft and having one set of common ends at the forward side of said cross-shaft and another set of common ends at the rearward side of said cross-shaft,
   a pair of support arms, each pivotally associated with a respective one of said walking beams for vertical movement relative to a respective one of said one set of common ends,
   a drive axle crosswise of and supported by said support arms,
   a pair of air bags, each disposed between and having its opposite ends connected to a respective support arm and a respective one of said one set of common ends,
   and a tag axle crosswise of and supported by the other set of common ends of said walking beams.

17. The construction according to claim 16 and including means for limiting movement of said other set of common ends of said walking beams in a downward direction.

18. A suspension for a motor vehicle having a frame including a pair of laterally spaced, longitudinally extending channels, comprising:
   a cross-shaft between said channels and having opposite ends journalled in bearings carried by respective channels,
   a pair of walking beams, each mounted on a respective end of said cross-shaft and having one set of common ends at the forward side of said cross-shaft and another set of common ends at the rearward side of said cross-shaft,
   a pair of support arms, each pivotally associated with a respective one of said walking beams for vertical movement relative to a respective one of said one set of common ends,
   a drive axle crosswise of and supported by said support arms, said drive axle including a differential and a drive shaft extending forwardly from said differential to a transmission,
   a pair of air bags, each disposed between and having its opposite ends connected to a respective support arm and a respective one of said one set of common ends at the rearward side of said cross-shaft,
   and a pusher axle, comprising a pair of stub axles, each connected to a respective one of said set of common ends at the forward side of said cross-shaft, each stub axle supporting a road engaging wheel and said stub axles being spaced to provide clearance for said drive shaft.

* * * * *